US006181580B1

(12) United States Patent
Laskai et al.

(10) Patent No.: US 6,181,580 B1
(45) Date of Patent: Jan. 30, 2001

(54) SINGLE-SUPPLY GRIDDING AND BIASING CIRCUITRY

(75) Inventors: Laszlo Laskai; Milan Zarko Ilic, both of Clifton Park, NY (US)

(73) Assignee: General Electric Company, Schenectady, NY (US)

( * ) Notice: Under 35 U.S.C. 154(b), the term of this patent shall be extended for 0 days.

(21) Appl. No.: 09/578,092

(22) Filed: May 25, 2000

(51) Int. Cl.⁷ .......................... H02M 3/335; H02M 7/538
(52) U.S. Cl. ............................. 363/24; 363/133
(58) Field of Search ................................. 363/24, 25, 97, 363/133; 327/199, 205, 214

(56) References Cited

U.S. PATENT DOCUMENTS

| | | | |
|---|---|---|---|
| 4,366,395 | 12/1982 | Gillard et al. | 327/597 |
| 4,593,371 | 6/1986 | Grajewski | 378/207 |
| 4,661,896 | * 4/1987 | Kobayashi et al. | 363/24 |
| 4,680,693 | * 7/1987 | Carron | 363/98 |
| 4,783,795 | * 11/1988 | Yahata | 363/26 |
| 4,805,080 | * 2/1989 | Nieminen | 363/56 |
| 5,107,412 | * 4/1992 | Fuchs | 363/96 |
| 5,969,955 | 10/1999 | Laskai et al. | 363/25 |
| 6,021,051 | 2/2000 | Laskai et al. | 363/20 |

FOREIGN PATENT DOCUMENTS

| | | |
|---|---|---|
| 100874 | 11/1976 | (CA) . |
| 2 709 396 | 8/1993 | (FR) . |
| 2 718 599 | 4/1994 | (FR) . |

OTHER PUBLICATIONS

"Generators and Tubes in Interventional Radiology," E. Ammann; G. Wiede, Syllabus: A Categorical Course in Physics, 8$^{th}$ Scientific Assembly and Annual Meeting of the Radiological Society of North America, Nov. 26–Dec. 1, 1995, pp. 59–74.

* cited by examiner

Primary Examiner—Peter S. Wong
Assistant Examiner—Bao Q. Vu
(74) Attorney, Agent, or Firm—Jill M. Breedlove; Douglas E. Stoner

(57) ABSTRACT

A single power supply circuit, including a push-pull input converter stage and a voltage-controlled latch circuit output stage isolated from each other by a transformer, provides both voltage gridding and biasing functions in, for example, an x-ray tube application. In the gridding mode, a first voltage level supplies the push-pull converter to provide an output voltage that is sufficiently high to trigger the voltage-controlled latch circuit and thereby provide grid control via a grid control electrode. In the biasing mode, a lower voltage level supplies the push-pull converter such that the output voltage is insufficient to trigger the voltage-controlled latch circuit. As a result, a resistive voltage divider provides a predetermined biasing voltage on a bias control electrode.

10 Claims, 4 Drawing Sheets

SINGLE-SUPPLY GRIDDING AND BIASING CIRCUITRY

BACKGROUND OF THE INVENTION

The present invention relates generally to power supplies and, more particularly, to single-power-supply circuitry for providing gridding and biasing functions suitable, for example, for electron tube applications, such as x-ray tubes or electron beam guns.

In one application, gridding circuits are employed for controlling x-ray tubes in pulsed fluoroscopy in order to reduce radiation exposure to patients resulting from decaying x-ray tube current. In particular, x-ray tube gridding involves rapid application and removal of a high-voltage (in the range of a few kilovolts) to a cathode cup, the cup functioning as a grid in conventional electron tubes. Upon grid voltage turn-off, the x-ray beam is turned on, and vice versa. The length of the on and off periods are typically measured in tens of milliseconds. High-voltage isolation is required for such applications, as the gridding circuit is referenced to a cathode potential of up to −70 kV in standard tubes and up to −140 kV in grounded anode tube designs.

In addition to grid control, an x-ray tube also requires bias control, i.e, for controlling the focal spot size of the x-ray beam. Hence, a grid-controlled x-ray tube typically has two control electrodes for providing the gridding and biasing voltages. Typically, two separate power supplies are used to provide the two voltages.

Accordingly, it is desirable to provide a single power supply circuit capable of providing both the gridding and biasing functions. To be practicable, it is further desirable that such circuitry be relatively simple, small in size, and reliable.

BRIEF SUMMARY OF THE INVENTION

A single power supply circuit, comprising a push-pull input converter stage and a voltage-controlled latch (VCL) circuit output stage isolated from each other by a transformer, provides both voltage gridding and biasing functions in, for example, an x-ray tube application. In the gridding mode, a first voltage level supplies the push-pull converter to provide an output voltage that is sufficiently high to trigger the VCL circuit and thereby provide grid control via a grid control electrode. In the biasing mode, a lower voltage level supplies the push-pull converter such that the output voltage is insufficient to trigger the VCL circuit. As a result, a voltage divider provides a predetermined biasing voltage on a bias control electrode. The two voltage levels may be provided by using a switch for switching in the voltage levels as desired, or by using two primary windings on the isolation transformer.

DETAILED DESCRIPTION OF THE INVENTION

Figure 1:
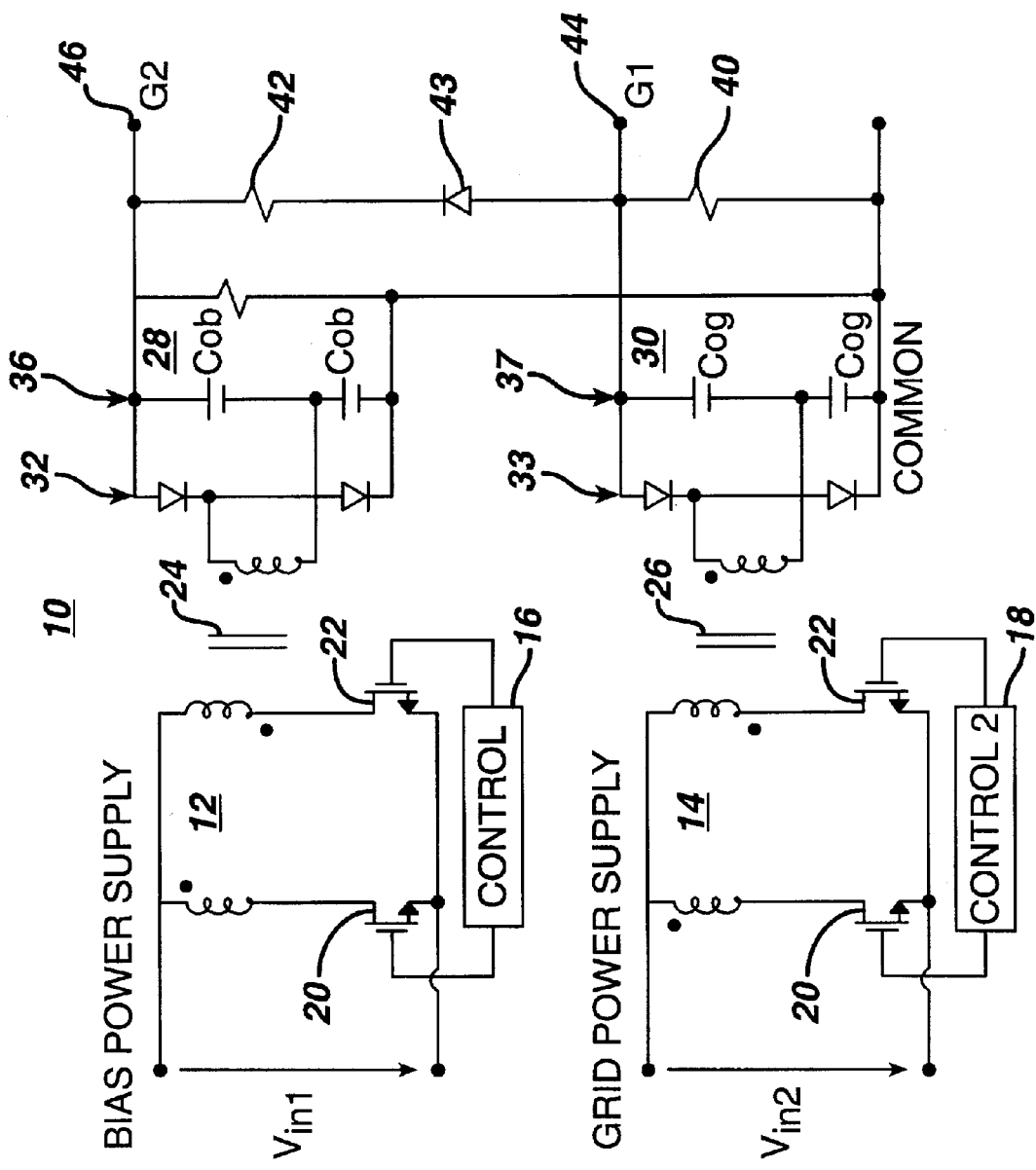
FIG. 1 schematically illustrates power supply circuitry of a type typically used for x-ray gridding and biasing.

FIG. 1 illustrates known gridding/biasing circuitry 10 suitable for x-ray tubes. Two push-pull circuits 12 and 14, respectively, each have an associated control 16 and 18, respectively, and comprise two switching devices 20 and 22 and isolation transformers 24 and 26, respectively. Secondary-side circuits 28 and 30, respectively, are illustrated as each comprising a diode rectifier 32 and 33, respectively, and an output capacitor pair 36 and 37, respectively. The secondary side circuitry also includes a voltage divider, illustrated as a resistive voltage divider comprising resistor 40 (R1) and 42 (R2). A diode 43 is connected in series with resistors R1 and R2. A grid control electrode 44 is represented at node G1; and a bias control electrode 46 is represented at node G2.

The gridding function can be performed with the bias function either on or off by appropriate on/off timing of the grid power supply 14. The dynamic range of the gridding circuitry is limited by the time constant of the grid supply output, i.e., as determined by the values of resistance 40 and the output capacitance 37. On the other hand, the biasing function does not require fast dynamics; i.e., it is either on or off.

Figure 2:
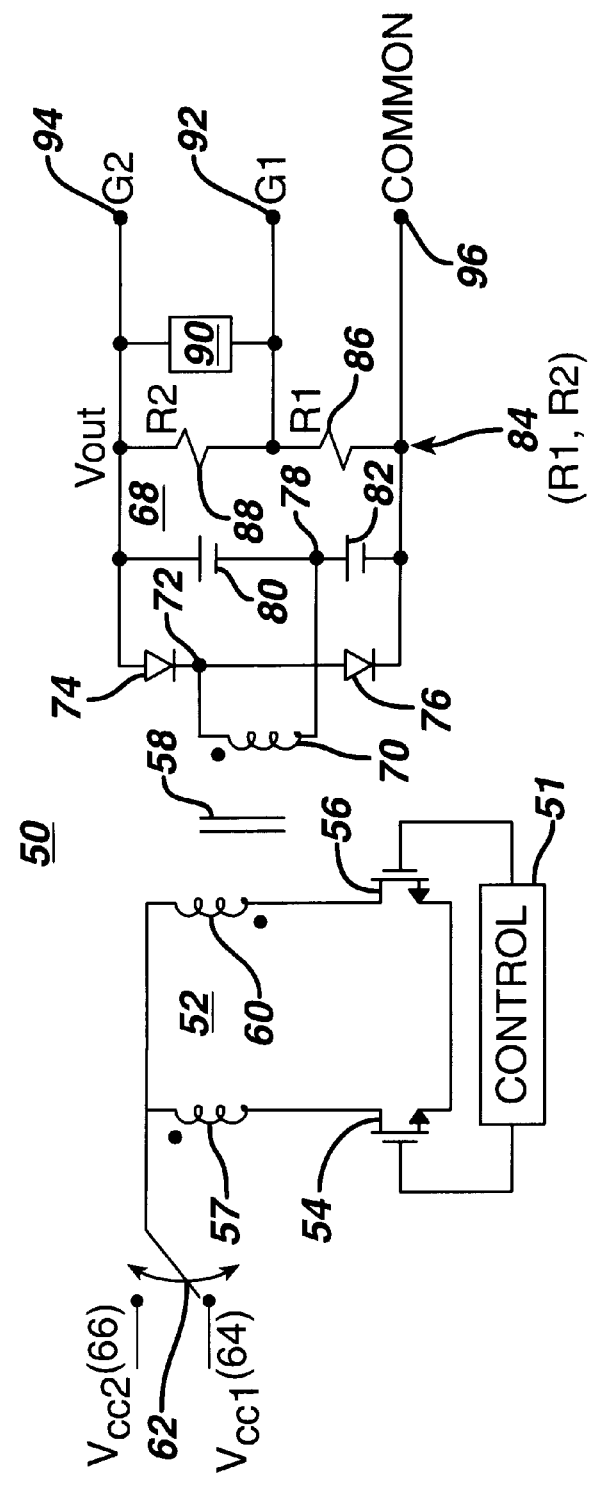
FIG. 2 schematically illustrates an exemplary embodiment of x-ray gridding/biasing circuitry according to the present invention.

FIG. 2 illustrates an exemplary embodiment of a gridding/biasing circuit 50 and control 51 according to the present invention. A single push-pull primary-side converter stage 52 comprises switching devices 54 and 56. Switching device 54 is coupled in series with a primary winding 57 of an isolation transformer 58. Switching device 56 is coupled in series with another primary winding 60 of transfomer 58. Each series leg of the input converter stage is illustrated as being coupled through a switch 62 to either an input voltage 64 (Vcc1) or an input voltage 66 (Vcc2), where Vcc1>Vcc2. An output converter stage 68 is coupled to the input stage 52 through a secondary winding 70 of transformer 58, one terminal of secondary winding 70 being connected to a junction 72 joining series-connected diodes 74 and 76, and the other terminal of secondary winding 70 being connected to a junction 78 between series-connected output capacitors 80 and 82. A resistive voltage divider 84 comprising resistors 86 (R1) and 88 (R2) is connected across the series-connected diodes and the series-connected capacitors. A voltage-controlled latch (VCL) circuit 90 is connected across resistor R2, the VCL circuit being connected between a grid control electrode 92 (G1) and a bias control electrode 94 (G2). Resistor R1 is connected between the grid control electrode and a circuit common terminal 96.

In operation, the push-pull converter steps up voltage from a relatively low voltage (e.g., rectified line voltage) to a relatively high voltage (e.g., a few thousand volts) referenced to the cathode cup potential (not shown). The input voltage and transformer turns ratio determine the output voltage Vout. In the gridding mode, in order to achieve the grid-on voltage, switch 62 is closed such that the voltage Vcc1 supplies the push-pull converter. In this mode, the output voltage is sufficiently high to trigger the VCL circuit, essentially shorting resistor R2. Grid control electrode G1 is thus connected to the output voltage Vout for providing grid control.

In the biasing mode, switch 62 is closed such that the lower voltage Vcc2 supplies the push-pull converter. The voltage across resistor R1 is thus not sufficient to trigger the VCL circuit; hence, the VCL circuit is off. The voltage on the grid control electrode G1 in this mode is represented as:

$$VG1 = \frac{R2}{R1 + R2} \cdot Vout$$

Figure 3:
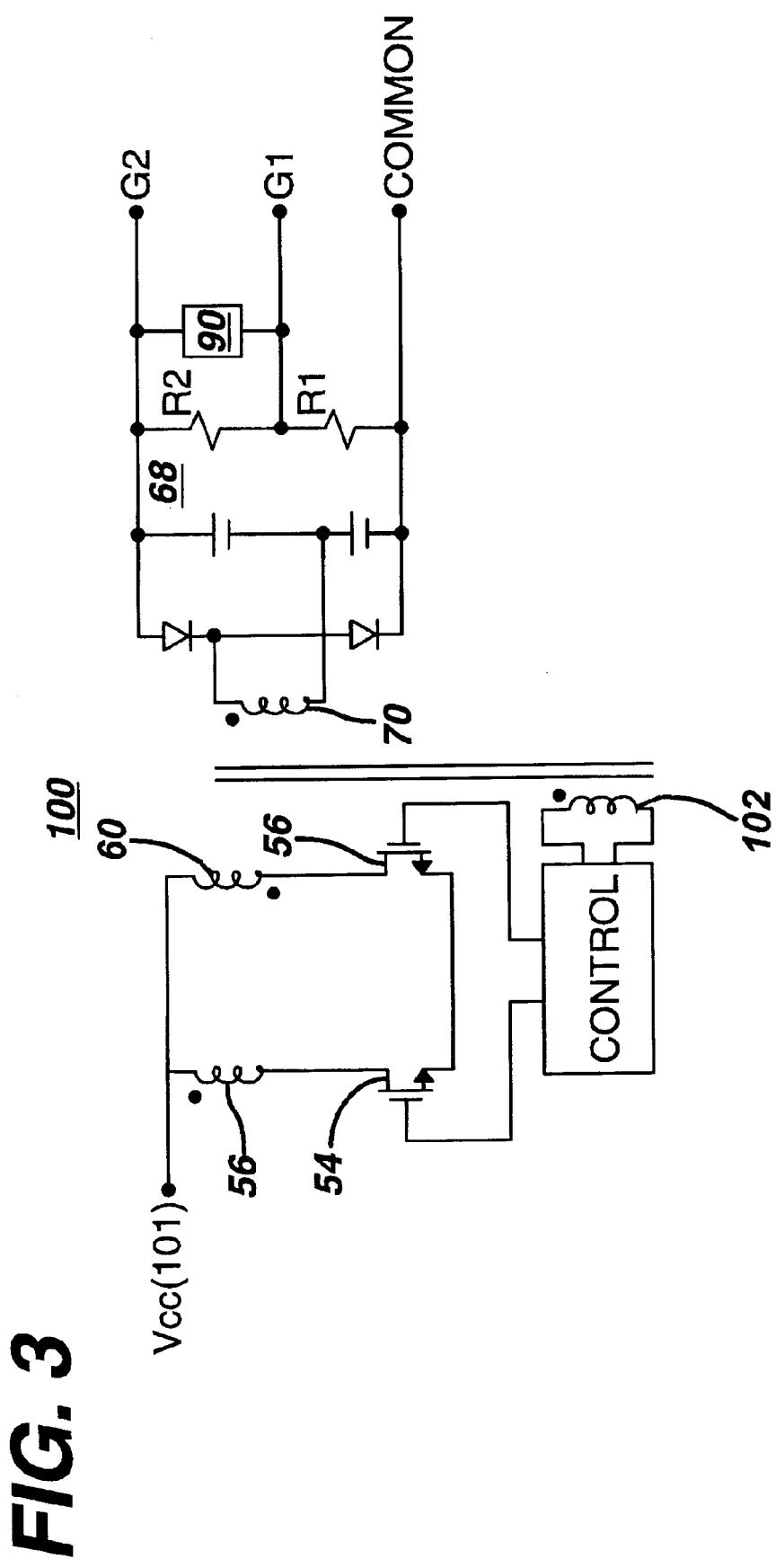
FIG. 3 illustrates another exemplary embodiment of x-ray gridding/biasing circuitry according to the present invention.

In an alternative embodiment, as illustrated in circuit 100 of FIG. 3, instead of using two voltage levels Vcc1 and Vcc2 on the primary side, a single voltage level 101 (Vcc) can be employed with an additional low voltage primary winding 102.

Figure 4:
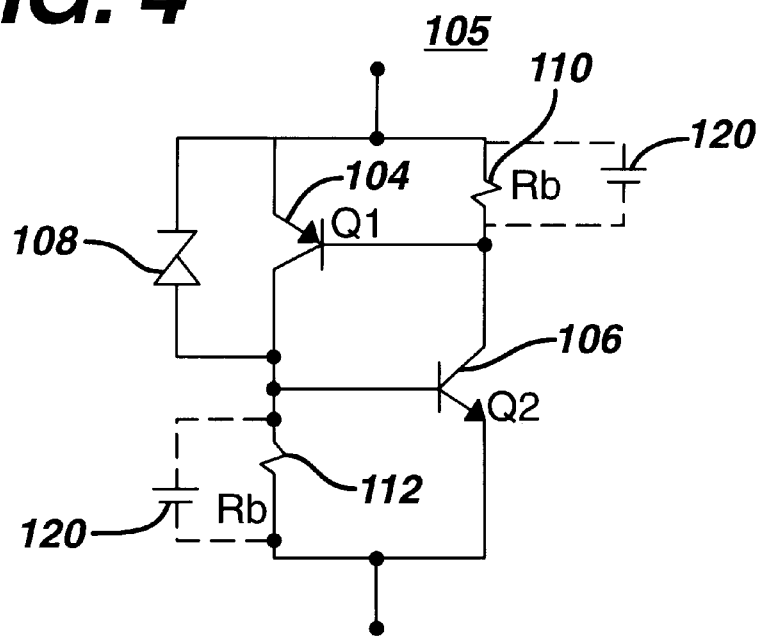
FIG. 4 illustrates an exemplary embodiment of a basic cell of a VCL circuit suitable for use in the circuitry of FIGS. 2 and 3.
Figure 5:
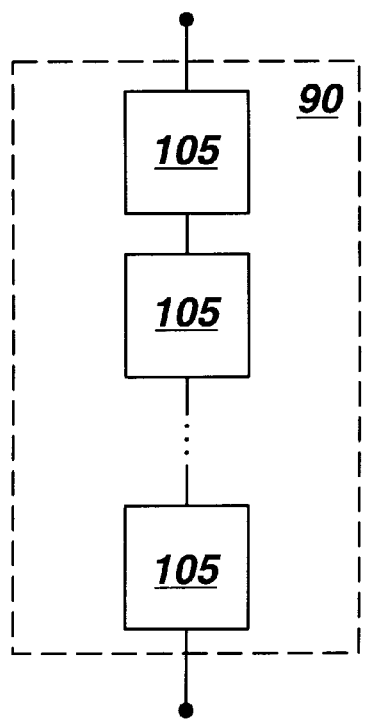
FIG. 5 illustrates construction of a VCL circuit as comprising a plurality of basic cell circuits.

FIG. 4 illustrates an exemplary basic cell 105 of VCL circuit 90. In particular, VCL circuit 90 comprises a chain of cells 105, as illustrated in FIG. 5. With respect to FIG. 4, cell circuit 105 is illustrated as comprising complementary switching devices, e.g., pnp and npn bipolar transistors 104 and 106, respectively. A trigger device 108 is illustrated as comprising a SIDAC, although other trigger devices may be employed, such as, for example, a gas discharge tube or a Zener diode or any other suitable trigger device. Resistors 110 and 112 (both illustrated as having the value Rb in FIG. 4) are each connected between the base of one of the switching devices and one of the terminals of the VCL circuit.

In operation, a voltage across cell circuit 105 that is higher than the breakdown voltage of the trigger device 108 results in a voltage drop across resistor Rb, triggering conduction of the switching devices 104 and 106. The holding current of the basic cell circuit can be adjusted by adjusting the value of Rb. The holding current is determined by the base-emitter voltage required to keep switching devices Q1 and Q2 on.

In addition, if desired, noise immunity can be improved by adding a capacitance 120 across each resistor Rb, as illustrated in phantom in FIG. 4.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A power supply circuit, comprising:
    an input converter stage comprising first and second switching devices in a push-pull configuration, the switching devices being coupled to at least one primary winding of an isolation transformer;
    an output converter stage coupled to the input converter stage via the isolation transformer for providing an output voltage, the output stage comprising a rectifier, an output capacitance, and a voltage-controlled latch circuit coupled between a grid control electrode and a bias control electrode;
    the input stage supplying a first voltage level that is sufficiently high to trigger the voltage-controlled latch circuit such that the converter output voltage is coupled to the grid control electrode for providing grid control;
    the input stage supplying a second voltage level that is lower than the first voltage level such that the voltage-controlled latch circuit is inactive, the output voltage is decoupled from the grid control electrode, and the bias control electrode provides bias control.

2. The power supply circuit of claim 1, further comprising a switch for switching between the first voltage level and the second voltage level.

3. The power supply circuit of claim 1, further comprising an additional primary winding for providing the second voltage level.

4. The power supply circuit of claim 1 wherein each switching device is coupled to a separate respective primary winding of the isolation transformer.

5. The power supply circuit of claim 1 wherein the output converter stage comprises a resistive voltage divider coupled across the output voltage, the voltage divider comprising a first resistance coupled between the grid control electrode and a reference potential and further comprising a second resistance coupled across the voltage-controlled latch circuit, such that the grid control electrode is connected to the output voltage when the voltage-controlled latch circuit is activated, and further such that the bias control electrode is connected to the output voltage when the voltage-controlled latch circuit is inactive.

6. The power supply circuit of claim 1 wherein the voltage-controlled latch circuit comprises at least one trigger device having a breakdown voltage for activating the voltage-controlled latch circuit.

7. The power supply circuit of claim 6 wherein the trigger device is selected from a group consisting of SIDAC's, Zener diodes, and gas discharge tubes.

8. The power supply circuit of claim 1 wherein the voltage-controlled latch circuit comprises:
    a plurality of VCL circuit cells, each cell comprising a complementary pair of VCL switching devices connected between two VCL circuit nodes such that the gate of each is coupled to the drain of the other, each having the emitter thereof connected to a respective one of the VCL circuit nodes, a trigger device connected across one of the VCL switching devices, and a resistance connected between the gate and emitter of each respective VCL switching device.

9. A power supply circuit, comprising:
    an input converter stage comprising first and second switching devices in a push-pull configuration, the switching devices being coupled to at least one primary winding of an isolation transformer;
    an output converter stage coupled to the input converter stage via the isolation transformer for providing an output voltage, the output stage comprising a rectifier, an output capacitance, and a voltage-controlled latch circuit coupled between a grid control electrode and a bias control electrode, the voltage-controlled latch circuit comprising at least one trigger device having a breakdown voltage for activating the voltage-controlled latch circuit;
    means for supplying a first voltage level that is sufficiently high to trigger the voltage-controlled latch circuit such that the converter output voltage is coupled to the grid control electrode for providing grid control, and for supplying a second voltage level that is lower than the first voltage level such that the voltage-controlled latch circuit is inactive, the output voltage is decoupled from the grid control electrode, and the bias control electrode provides bias control.

10. A voltage-controlled latch, comprising:
    a plurality of VCL circuit cells, each cell comprising a complementary pair of VCL switching devices connected between two VCL circuit nodes such that the gate of each is coupled to the drain of the other, each having the emitter thereof connected to a respective one of the VCL circuit nodes, a trigger device connected across one of the VCL switching devices, and a resistance connected between the gate and emitter of each respective VCL switching device.

* * * * *